US009497586B2

(12) United States Patent
Akizuki et al.

(10) Patent No.: US 9,497,586 B2
(45) Date of Patent: Nov. 15, 2016

(54) RADIO COMMUNICATION SYSTEM AND MOBILE INFORMATION TERMINAL

(71) Applicant: Panasonic Intellectual Property Management Co., Ltd., Osaka (JP)

(72) Inventors: Ryutan Akizuki, Fukuoka (JP); Noboru Iida, Fukuoka (JP); Yutaka Ikeda, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 443 days.

(21) Appl. No.: 14/101,223

(22) Filed: Dec. 9, 2013

(65) Prior Publication Data

US 2014/0171041 A1    Jun. 19, 2014

(30) Foreign Application Priority Data

Dec. 13, 2012 (JP) ................................. 2012-272412
Aug. 19, 2013 (JP) ................................. 2013-169584

(51) Int. Cl.
*H04M 3/42* (2006.01)
*H04W 4/02* (2009.01)
(Continued)

(52) U.S. Cl.
CPC ............. *H04W 4/02* (2013.01); *H04M 1/7253* (2013.01); *H04M 1/72563* (2013.01);
(Continued)

(58) Field of Classification Search
CPC ............ H04M 1/7253; H04M 1/72563; H04M 2250/04; H04W 4/02; H04W 52/0229; H04W 52/0245
(Continued)

(56) References Cited

U.S. PATENT DOCUMENTS 5,675,629 A    10/1997 Raffel et al.
6,058,289 A    5/2000 Gardner et al.
(Continued)

FOREIGN PATENT DOCUMENTS

JP    11-75252 A    3/1999
JP    2003116166 A    4/2003
(Continued)

OTHER PUBLICATIONS

Extended European Search Report dated Apr. 3, 2014, for corresponding EP Patent Application No. 13196099.9-1972, 7 pages.

*Primary Examiner* — Timothy Pham
(74) *Attorney, Agent, or Firm* — Seed IP Law Group LLP

(57) ABSTRACT

An operation for reconnecting a mobile information terminal and a base unit, which is performed when a user returns home, is made easier, and a matter that has occurred in the base unit during his absence is displayed on the mobile information terminal. The mobile information terminal enters a sleep state when receiving no signal from the base unit. When the user performs a predetermined operation, the mobile information terminal returns from the sleep state, then searches for the base unit, and displays, on a display section, information relating to the matter that has occurred during his absence, the information being transmitted from the base unit when the terminal is reconnected to the base unit. Accordingly, the user can know, through a simple operation, the record of an incoming call received through a wired network, or an answering machine message that has occurred during his absence from the base unit.

15 Claims, 11 Drawing Sheets

(51) Int. Cl.
*H04M 1/725* (2006.01)
*H04W 52/02* (2009.01)

(52) U.S. Cl.
CPC ..... *H04W 52/0229* (2013.01); *H04W 52/0245* (2013.01); *H04M 2250/04* (2013.01)

(58) Field of Classification Search
USPC ..................................................... 455/414.1
See application file for complete search history.

(56) References Cited

U.S. PATENT DOCUMENTS

| | | | |
|---|---|---|---|
| 6,198,926 | B1 | 3/2001 | Lorieau |
| 6,611,692 | B2 | 8/2003 | Raffel et al. |
| 6,681,118 | B2 | 1/2004 | Raffel et al. |
| 7,035,646 | B2 | 4/2006 | Raffel et al. |
| 2003/0050090 | A1 | 3/2003 | Raffel et al. |
| 2003/0069014 | A1 | 4/2003 | Raffel et al. |
| 2004/0058676 | A1* | 3/2004 | Kato ............... H04M 1/2535 455/422.1 |
| 2004/0152482 | A1 | 8/2004 | Raffel et al. |
| 2005/0176420 | A1 | 8/2005 | Graves et al. |
| 2009/0203325 | A1* | 8/2009 | Wang ............... H04W 36/0088 455/69 |
| 2011/0319086 | A1* | 12/2011 | Katori ............... H04W 48/08 455/440 |
| 2012/0072751 | A1 | 3/2012 | Das et al. |
| 2014/0167957 | A1 | 6/2014 | Tsuji et al. |

FOREIGN PATENT DOCUMENTS

| | | |
|---|---|---|
| JP | 2004-320576 A | 11/2004 |
| JP | 2004343608 A | 12/2004 |
| JP | 2007-97206 A | 4/2007 |
| JP | 2007-288598 A | 11/2007 |
| JP | 2014-120799 A | 6/2014 |
| JP | 5557950 B1 | 6/2014 |

* cited by examiner

| SELF-LOCATION DATA | TIME | FLAG ("NORMAL"/"ABNORMALITY") |
|---|---|---|
| NORTH LATITUDE: ** DEGREES ** MINUTES ** SECONDS<br>EAST LONGITUDE: ** DEGREES ** MINUTES ** SECONDS | ** HR ** MIN ** SEC | "NORMAL" |
| NORTH LATITUDE: ** DEGREES ** MINUTES ** SECONDS<br>EAST LONGITUDE: ** DEGREES ** MINUTES ** SECONDS | ** HR ** MIN ** SEC | "NORMAL" |
| NORTH LATITUDE: ** DEGREES ** MINUTES ** SECONDS<br>EAST LONGITUDE: ** DEGREES ** MINUTES ** SECONDS | ** HR ** MIN ** SEC | "NORMAL" |
| NORTH LATITUDE: ** DEGREES ** MINUTES ** SECONDS<br>EAST LONGITUDE: ** DEGREES ** MINUTES ** SECONDS | ** HR ** MIN ** SEC | "ABNORMALITY" |
| NORTH LATITUDE: ** DEGREES ** MINUTES ** SECONDS<br>EAST LONGITUDE: ** DEGREES ** MINUTES ** SECONDS | ** HR ** MIN ** SEC | "ABNORMALITY" |
| NORTH LATITUDE: ** DEGREES ** MINUTES ** SECONDS<br>EAST LONGITUDE: ** DEGREES ** MINUTES ** SECONDS | ** HR ** MIN ** SEC | "ABNORMALITY" |
| · · · · | · · · · | · · · · |

FIG. 11

RADIO COMMUNICATION SYSTEM AND MOBILE INFORMATION TERMINAL

CROSS REFERENCE TO RELATED APPLICATIONS

This application is entitled and claims the benefit of Japanese Patent Application No. 2012-272412, filed on Dec. 13, 2012, and Japanese Patent Application No. 2013-169584, filed on Aug. 19, 2013, the disclosures of which including the specifications, drawings and abstracts are incorporated herein by reference in their entirety.

TECHNICAL FIELD

The present invention relates to a radio communication system and a mobile information terminal that make an operation for reconnecting a mobile information terminal and a base unit easier, which is performed when a user returns home.

BACKGROUND ART

In recent years, digitalization of cordless telephones used in houses has been developed, so that high-sound quality and improvements in the security of cordless telephones are achieved. In addition, portable handsets of cordless phones having not only a voice call function but also serving as a sensor or a surveillance camera have been introduced.

Meanwhile, highly functional cellular phones such as smartphones provided with advanced functions in addition to a communication function for communicating with a public mobile phone network have been developed. The advanced functions include: a Bluetooth (registered trademark) communication function for performing near field radio communication; or a global positioning system (GPS) receiver receiving signals from a GPS, for example.

When voice or video communication or data is made shareable by building a link between a cordless telephone disposed inside a house and a cellular phone, the base unit of the cordless telephone and the cellular phone need to be synchronized with each other so as to be capable of communicating with each other at any time. However, when the cellular phone is taken out to the outside of the house, the communication function of the cellular phone with the base unit does not need to be operated. Even when various communication functions are built in the cellular phone, putting these functions in operation always increases power consumption.

For example, Japanese Patent Application Laid-Open No. 2004-343608 discloses a radio phone device that avoids increases in power consumption in the case of being out of a service range. According to the disclosure, when it is detected that the radio phone device is out of a service range in which electric waves transmitted from the base unit in the house are receivable and when this state of the radio phone device continues at least for a predetermined time, the radio phone device stops a search for the base unit (open search), thereby avoiding increases in the power consumption when the radio phone device is out of the service range. In addition, it is possible to resume the search for the base unit as appropriate by being triggered upon an operation performed in an operation section or the like and to return the radio phone device to the communicable state.

In addition, the GPS receiver provided in the cellular phone is operated mainly when the cellular phone is taken out to the outside of the house. Thus, when the cellular phone is placed inside the house, the need for operating the GPS receiver is low. Since the GPS receiver continuously receives signals transmitted from satellites, the power consumption required for calculating the location of the GPS receiver is large. Accordingly, when the GPS receiver continuously operates even at an unnecessary location, the consumption of the battery is large. Although it is possible for a user to manually switch the operation mode, the user needs to pay attention to the operation mode, which results in an extra burden to the user.

Japanese Patent Application Laid-Open No. 2003-116166 discloses, as a system capable of detecting the location of a portable handset without using a GPS, a location detecting system in which a plurality of base units performing near-field radio communication are arranged in a lattice pattern at intervals of a maximum communication distance, so that a portable handset can detect the location of the portable handset by searching for the base units always. According to this location detecting system, a search procedure is repeated in which: the portable handset transmits the ID thereof at the time of finding a base unit; a link is built through authentication given by the base unit; the link is released after the building of the link; and a search for another base unit is performed. Each of the base units herein receives the ID of the portable handset and transmits the received ID to a host computer in this system. Since the location of each base unit is known and is recorded in the host computer, the location of the portable handset can be identified based on the location of the base unit that has communicated with the portable handset having the corresponding ID.

CITATION LIST

Patent Literature

PTL1
Japanese Patent Application Laid-Open No. 2004-343608
PTL2
Japanese Patent Application Laid-Open No. 2003-116166

SUMMARY OF INVENTION

Technical Problem

According to the related art described above, for example, when a search (open search) for a base unit continues when the user having the mobile information terminal with him goes out, unnecessary power is consumed due to the open search. In addition, if the user forgets to perform an operation for connecting to the base unit at the time of returning to the home while the search for the base unit completely stops when a signal transmitted from the base unit is not detectable, the mobile information terminal and the base unit cannot communicate with each other, and the user cannot immediately notice the information of an incoming call or the like that has been received during his absence from home at the time of returning to the home. Accordingly, there arises a problem in that the user needs to pay attention to the operation at the time of returning to the home.

An object of the present invention is to provide a radio communication system and a mobile information terminal that make an operation for reconnecting a mobile information terminal and a base unit easier, which is performed when a user returns home, and that avoid increases in unnecessary power consumption associated with an open search.

Solution to Problem

In order to achieve the abovementioned object, a radio communication system according to an aspect of the present invention includes: a base unit to be connected to a public wired network; and a mobile information terminal that includes a near field radio communication section performing communication with the base unit using a near field communication protocol and that includes a public radio communication section performing radio communication with a public radio network, in which: the mobile information terminal enters a sleep state when receiving no signal from the base unit and searches for the base unit when a user performs a predetermined operation, and when reconnected to the base unit, the mobile information terminal displays, on a display section, information relating to a matter that has occurred during absence of the user, the information being transmitted from the base unit; and the base unit records the matter that has occurred during the absence of the user, and when reconnected to the mobile information terminal, the base unit transmits the information relating to the matter that has occurred during the absence of the user to the mobile information terminal.

A mobile information terminal according to an aspect of the present invention includes: a near field radio communication section that performs communication with a base unit of a radio communication system using a near field communication protocol; and a public radio communication section that performs radio communication with a public radio network, in which the mobile information terminal enters a sleep state when receiving no signal from the base unit, and searches for the base unit when a user performs a predetermined operation, and when reconnected to the base unit, the mobile information terminal displays, on a display section, information relating to a matter that has occurred during absence of the user, the information being transmitted from the base unit.

A base unit of a radio communication system according to an aspect of the present invention is a base unit configured to connect to a public wired network and to perform communication with a mobile information terminal using a near field radio communication protocol, in which the base unit records a matter that has occurred during absence of a user, and the base unit transmits information relating to the matter that has occurred during the absence of the user to the mobile information terminal when reconnected to the mobile information terminal.

Advantageous Effects of Invention

According to the present invention, an operation for reconnecting a mobile information terminal and a base unit, which is performed when a user returns home, is made easier, and the user can know a matter that has occurred during his or her absence from home in a simple manner based on information transmitted from the base unit and indicated on the mobile information terminal.

BRIEF DESCRIPTION OF DRAWINGS

FIG. 11 is a schematic diagram that illustrates an example of information recorded in a self-location data table of the mobile information terminal in the radio communication system according to the present invention.

DESCRIPTION OF EMBODIMENTS

Figure 1:
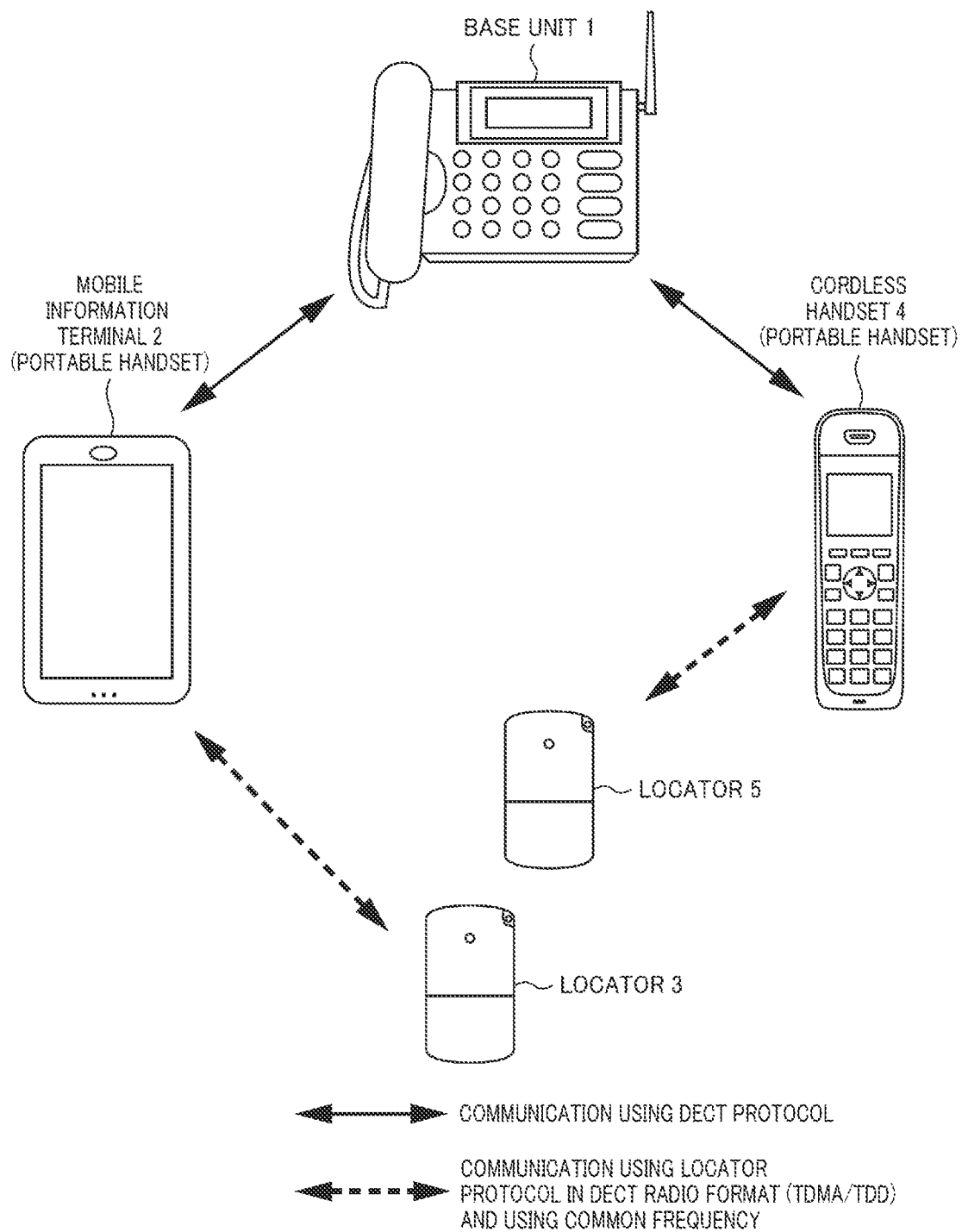
FIG. 1 is a system configuration diagram that illustrates an example of a radio communication system according to the present invention.

A radio communication system according to an aspect of the present invention includes: a base unit to be connected to a public wired network; and a mobile information terminal that includes a near field radio communication section performing communication with the base unit using a near field communication protocol and that includes a public radio communication section performing radio communication with a public radio network. In the radio communication system, the mobile information terminal enters a sleep state when receiving no signal from the base unit and searches for the base unit when a user performs a predetermined operation, and when reconnected to the base unit, the mobile information terminal displays, on a display section, information relating to a matter that has occurred during absence of the user, the information being transmitted from the base unit. In the radio communication system, the base unit records the matter that has occurred during the absence of the user, and when reconnected to the mobile information terminal, the base unit transmits the information relating to the matter that has occurred during the absence of the user to the mobile information terminal.

According to this configuration, when the mobile information terminal and the base unit cannot communicate with each other, for example, when the user having the mobile information terminal with him goes out, the base unit records a matter that has occurred during absence of a user, the mobile information terminal automatically starts communicating with the base unit in accordance with only a predetermined user operation in the mobile information terminal at the time of returning to the home, and the mobile information terminal can acquire information relating to a matter that has occurred during the absence of the user from the base unit and display a record of incoming calls received through a fixed telephone network and the like, for example, on the display section.

In addition, a radio communication system according to the present invention employs a configuration in which, even after receiving no signal from the base unit and thus entering the sleep state, the mobile information terminal returns from the sleep state and performs an operation of searching for the base unit at a first predetermined cycle during a predetermined period, and after the predetermined period elapses, the mobile information terminal returns from the sleep state and performs an operation of searching for the base unit at a second predetermined cycle that is longer than the first predetermined cycle.

According to such a configuration, in a case where the user forgets to perform a predetermined operation at the time of returning home, the operation of searching for the base unit at least at the second predetermined cycle is performed, and accordingly, the user can acquire necessary information from the base unit disposed in the house.

In addition, in a radio communication system according to the present invention, the mobile information terminal is configured to perform a display operation that indicates a near field radio non-connection state when being not communicable with the base unit.

According to such a configuration, for example, when the user having the mobile information terminal with him goes out, a display operation that indicates a near field radio non-connection state is performed, whereby the user can be urged to call his attention. Accordingly, it prevents the user from forgetting to perform an operation for the connection at the time of returning home.

In addition, in the radio communication system according to the present invention, the mobile information terminal is configured to include a touch panel and to be connectable to a cellular phone network and the Internet through the public radio network.

According to such a configuration, even when the user having the mobile information terminal with him goes out, the user can acquire information not through the base unit but through the cellular phone network or the Internet.

Embodiment 1

Hereinafter, embodiments of the present invention will be described.

First, an example of the configuration of a radio communication system according to an embodiment of the present invention will be described. FIG. 1 is a diagram that illustrates an example of the radio communication system according to this embodiment.

As illustrated in FIG. 1, the radio communication system is equipped with base unit 1, mobile information terminal 2 that operates as a portable handset registered in base unit 1, and cordless handset 4. Base unit 1 is connected to a public wired network. Here, home radio communication that is compliant with the digital enhanced cordless telecommunications (DECT) standard is performed among base unit 1, mobile information terminal 2, and cordless handset 4. Mobile information terminal 2 is a communication terminal that can be not only placed inside the house but also taken out and placed outside the house and, for example, is a mobile information terminal (a PDA or a tablet terminal) or the like that is equipped with a touch panel and is connectable to a cellular phone network and the Internet through a public radio network. On the other hand, cordless handset 4 is used only in the house and performs home radio communication with base unit 1 based on the DECT standard and is used mainly in a case where a phone call is made through a public wired network.

Locator 3 is a terminal that is attached to an item to be detected by the user and is built in a tag, a holder, or the like that is attachable to a key or the like. Mobile information terminal 2 and cordless handset 4 and locator 3 perform near field radio communication using a locator protocol, and a calling signal and a response signal are exchanged through the radio communication. Locator 3 transmits a response signal in response to a calling signal transmitted from mobile information terminal 2.

The locator protocol is a communication protocol used for performing communication in the radio format and the frequency in a time division multiple access (TDMA)/time division duplex (TDD) mode. In this embodiment, as an example, a protocol acquired by changing the above-described DECT standard as a base to be appropriate for power saving communication of the locator and the like is used.

Base unit 1 is a reference for the synchronization of radio communication of the DECT mode, and mobile information terminal 2 and cordless handset 4 operate as slave apparatuses according to the synchronization reference of base unit 1. Locator 3 and locator 5 are slave apparatuses according to the synchronization reference of mobile information terminal 2.

Figure 2:
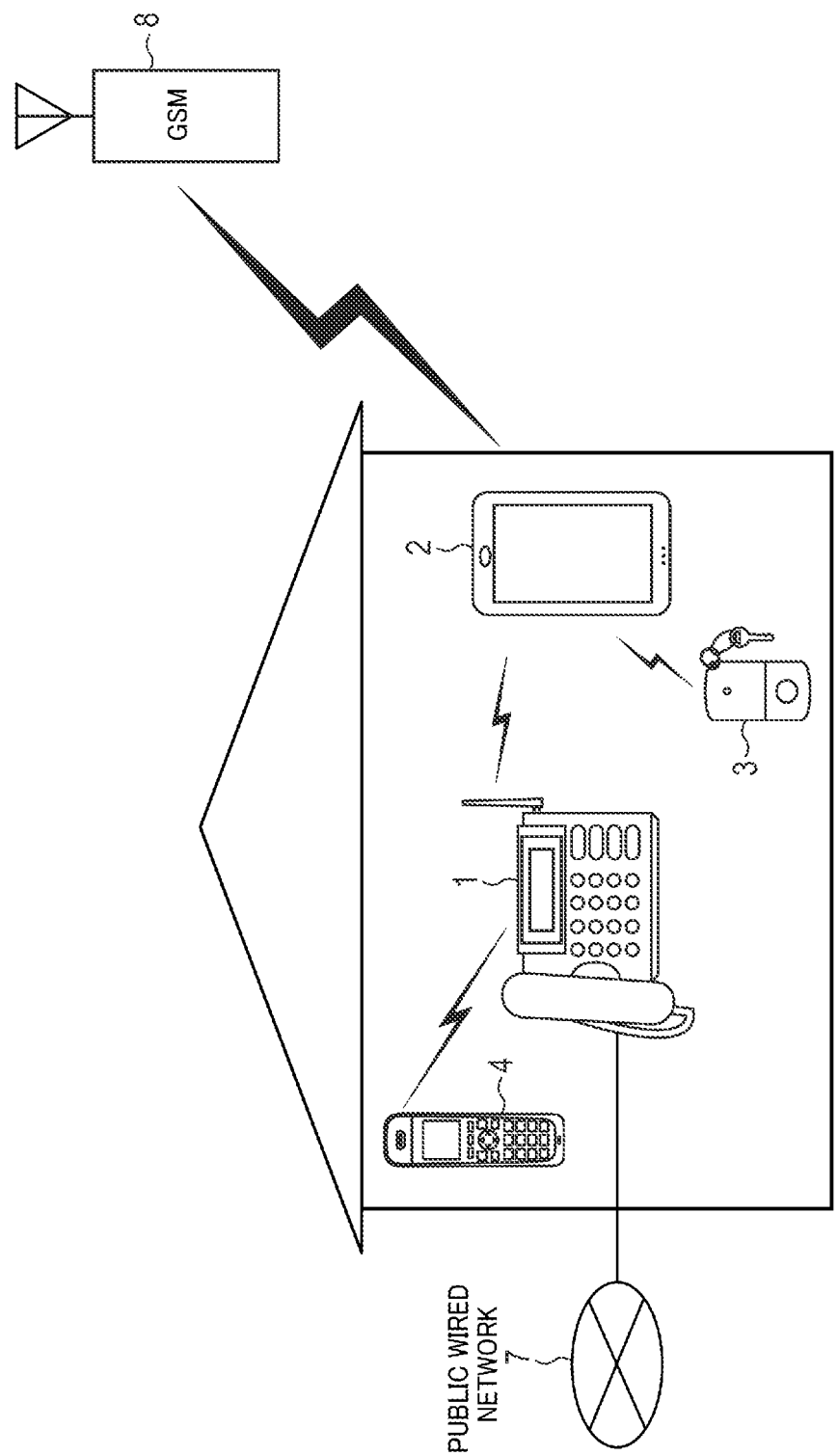
FIG. 2 is a schematic diagram that illustrates an example of the use form of the radio communication system.

FIG. 2 illustrates the state where both mobile information terminal 2 and locator 3 are located near base unit 1 (for example, inside the house) in the radio communication system illustrated in FIG. 1. Base unit 1 is connected to public wired network 7. Mobile information terminal 2 is communicable with a cellular phone network through public radio network 8, is communicable with base unit 1 through home radio communication using the DECT mode, and is also communicable with the outside using public wired network 7 through base unit 1.

When mobile information terminal 2 and locator 3 are located at a communicable distance, both parties perform near field communication using a locator protocol. A calling signal and a response signal are exchanged through this radio communication. Mobile information terminal 2 transmits a calling signal to locator 3, and locator 3 transmits a response signal in response to the calling signal transmitted from mobile information terminal 2.

Mobile information terminal 2 includes a notification unit that detects a signal reception level of a response signal transmitted from locator 3 and issues notification using a sound, light, or the like when the signal reception level is detected to be lower than a predetermined signal reception level value (updated based on learning) for a predetermined period.

Figure 3:
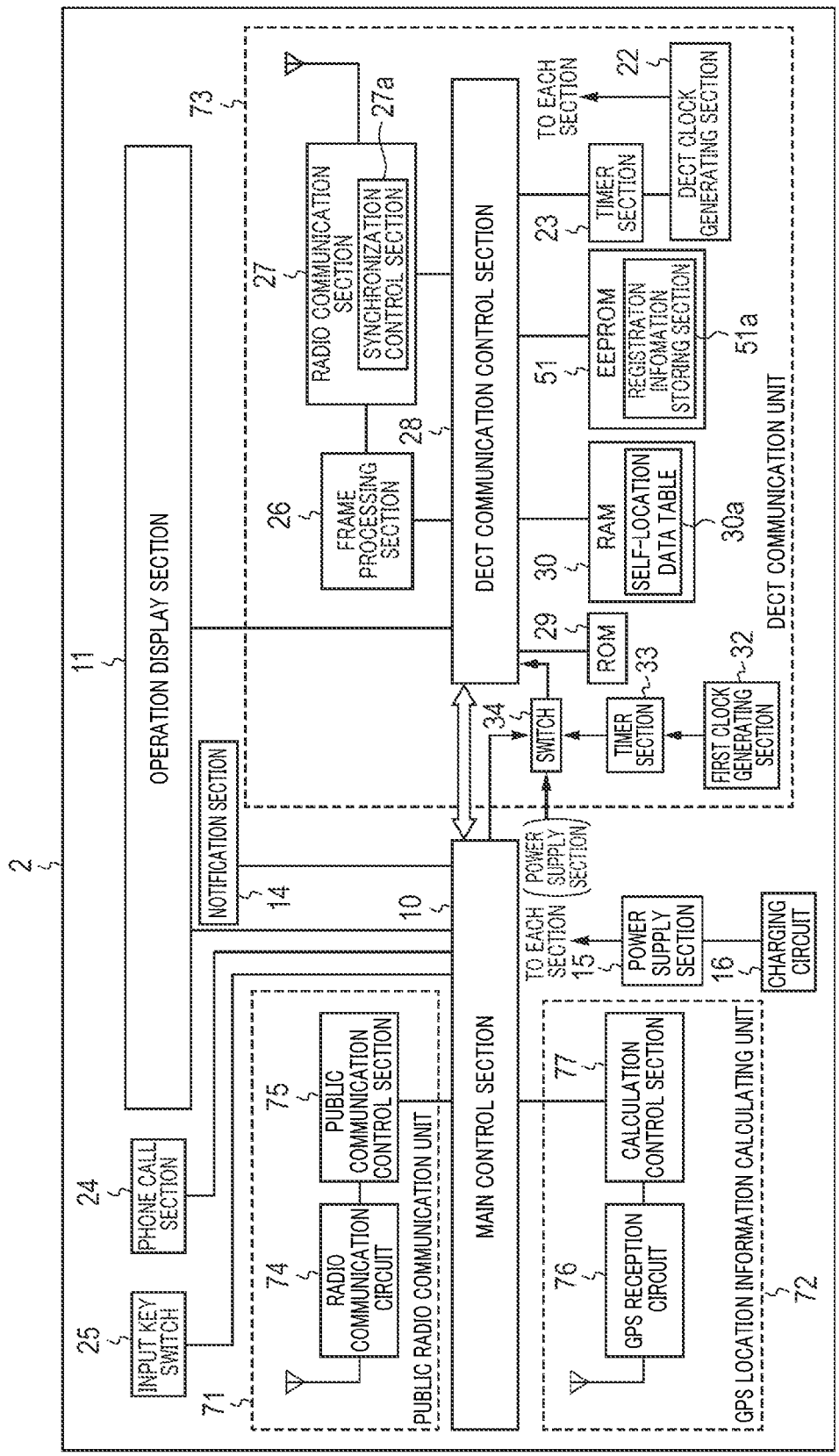
FIG. 3 is a block diagram that illustrates an example of the configuration of a mobile information terminal of the radio communication system.

Next, an example of the configuration of mobile information terminal 2 will be described. As illustrated in FIG. 3, mobile information terminal 2 is equipped with main control section 10 that is configured by a microcomputer as its central constituent member. In addition, operation display section 11 such as a touch panel used for receiving various operations and displaying various states is included therein. Operation display section 11 includes a touch key that is externally exposed and a liquid crystal display. Phone call section 24 includes a microphone, a speaker, a voice amplifier, and the like that are used for making a voice call.

Notification section 14 has a function of an incoming call notification section and a function for generating a confirmation sound, for example, upon the operation of an input key. Notification section 14, for example, includes a small speaker and, in a case where a calling signal is received from base unit 1, outputs a notification sound when a calling signal is received from public radio network 8.

In addition, mobile information terminal 2 includes three radio communication sections, in other words, public radio communication unit 71, GPS location information calculating unit 72, and DECT communication unit 73 that is based on the DECT.

Public radio communication unit 71 performs radio communication with public radio network 8 using electric waves. GPS location information calculating unit 72 performs location detection using a global positioning system. In addition, DECT communication unit 73 communicates with specific apparatuses such as base unit 1 of a cordless telephone of the DECT mode and locator 3 that are placed mainly in a house.

Mobile information terminal 2 is equipped with power supply section 15 that supplies power to each section and charging circuit 16 that charges power supply section 15, and all of these is housed inside a case having a portable size. Power supply section 15 supplies power used for operating public radio communication unit 71, GPS location information calculating unit 72, and main control section 10 in addition to DECT communication unit 73.

Phone call section 24 includes a voice amplifier, a speaker, a microphone, and the like that are used for making a voice call. Input key switch 25 is a key switch that enables an operation input of an emergency notification or the like. In a case where a normal response is not returned from locator 3 for the operation of regularly calling locator 3 that is performed by mobile information terminal 2, an emergency notification using this input key switch 25 can be made.

Public radio communication unit 71 includes radio communication circuit 74 that demodulates a received signal received by an antenna, outputs received data, and outputs a transmission signal acquired by modulating transmission data toward an antenna and public communication control section 75 that controls the operation of radio communication circuit 74.

GPS location information calculating unit 72 is configured by GPS reception circuit 76 that demodulates a reception signal received by the GPS reception antenna and outputs received data and calculation control section 77 that acquires location information through calculation using received information.

Main control section 10 of mobile information terminal 2 constantly monitors an operation input made using operation display section 11 on a processing program mainly based on a microcomputer and performs a process that corresponds to the input. Public radio communication unit 71, GPS location information calculating unit 72, and DECT communication unit 73 are controlled by this main control section 10, and thereby performing transmission/reception of data and the calculation of self-location data.

Operation display section 11 such as a touch panel serves as a user interface (UI) used for receiving various user operations. Operation display section 11, for example, includes a touch panel that is placed on the surface of the liquid crystal display. As the user operations, display operations for a telephone book, an operation menu, and the like are performed in addition to the reception/origination of a phone call, and operations of all the applications as an information terminal are performed by operation display section 11. In addition, an operation (calling operation) for calling locator 3, display and other operations performed for allowing a user to check the status relating to the operation of locator 3, and the like are performed by this operation display section 11.

DECT communication unit 73 of mobile information terminal 2 includes: first clock generating section 32, timer section 33, and switch 34. In addition, DECT communication unit 73 includes a communication block that includes a control section for DECT communication and the other parts used for communication, and the communication block operates using power that is supplied when switch 34 is turned on. This communication block includes DECT clock generating section 22, timer section 23, frame processing section 26, radio communication section 27, DECT communication control section 28, read only memory (ROM) 29; random-access memory (RAM) 30, and electrically erasable programmable read-only memory (EEPROM) 51.

First clock generating section 32 generates a clock signal used for operating timer section 33 based on the power that is constantly supplied from power supply section 15. First clock generating section 32, for example, includes a crystal oscillation circuit.

DECT clock generating section 22, for example, includes a crystal oscillation circuit, operates based on power supplied from power supply section 15 through switch 34, and generates a clock signal used for operating each section of the communication block. Timer section 23 counts a specified time period based on the clock signal transmitted from DECT clock generating section 22.

Radio communication section 27 performs radio communication that is compliant with the DECT standard with base unit 1. In addition, radio communication section 27 performs radio communication with the locator by using the locator protocol. For example, radio communication section 27 transmits a calling signal to locator 3 by using the locator protocol and receives a response signal in response thereto from locator 3.

Radio communication section 27 includes a radio antenna. Synchronization control section 27a arranged inside radio communication section 27 determines communication timing of a communication signal according to radio communication section 27 based on a reference clock of DECT clock generating section 22.

DECT communication control section 28, for example, includes a central processing unit (CPU) and controls a DECT communication operation in cooperation with each section. The control process performed by DECT communication control section 28 will be described later.

Frame processing section 26 generates a signal using a protocol matching the operation mode at that time and passes a signal of the frame configuration including identification information of a communication opponent selected by DECT communication control section 28 to radio communication section 27. Various signals are transmitted from radio communication section 27. In addition, frame processing section 26 receives signal data received by radio communication section 27 and extracts necessary information in accordance with a protocol matching the operation mode at that time.

For example, when a start operation of the DECT communication mode is performed through operation display section 11, DECT communication control section 28 starts an operation of searching for a control signal of base unit 1 by controlling radio communication section 27. The signal received by radio communication section 27 is transmitted to DECT communication control section 28. In a case where the received signal is a control signal transmitted from base unit 1, information that is needed for the synchronization is extracted from the received data, and the extracted information is passed to DECT communication control section 28 and radio communication section 27.

In addition, frame processing section 26 embeds the transmission information in the frame by using a frame configuration matching the operation mode at that time and passes the transmission information to radio communication section 27. For example, in a case where a call starting operation is performed such that a calling signal is transmitted to locator 3, frame processing section 26 generates a signal using the locator protocol, and the calling signal is transmitted from radio communication section 27 to locator 3.

ROM 29 stores control programs used by DECT communication control section 28 and various kinds of data therein. RAM 30 and EEPROM 51 are working memories of DECT communication control section 28.

Self-location data table 30*a* storing self-location data in a time series is assigned to RAM 30. The self-location data acquired by GPS location information calculating unit 72 is sequentially recorded in this self-location data table 30*a*.

Registration information storing section 51*a* of EEPROM 51 stores an ID of mobile information terminal 2 itself (hereinafter, referred to as a "mobile information terminal ID"), an ID of base unit 1, and an ID of locator 3 therein. The mobile information terminal ID is a unique identifier that is assigned in advance. For example, in a case where a locator ID (an example of the registration information) can be acquired from locator 3 that is a registration opponent, registration information storing section 51*a* stores the locator ID therein.

DECT clock generating section 22 supplies a high-speed clock signal having a frequency higher than the low-speed clock signal of first clock generating section 32 to each section of the communication block, and an operation for communication is controlled in accordance with this high-speed clock signal. Synchronization control section 27*a* provided in radio communication section 27 determines communication timing of a communication signal according to radio communication section 27 based on a reference clock of DECT clock generating section 22.

DECT communication control section 28 operates based on the clock signal that is generated by DECT clock generating section 22 and controls the overall operation of the communication block. DECT communication control section 28 controls communication with base unit 1 or locator 3 by executing a control program that is stored in ROM 29.

Timer section 23 can count a plurality of periods of time separately. For example, timer section 23 operates as a second timer. The second timer starts counting by being triggered upon the reception of a signal transmitted from base unit 1 (start of the second timer) and ends the counting in accordance with the elapse of a predetermined time (expiration of the second timer). In addition, timer section 23 operates as a third timer. The third timer starts counting by being triggered upon the insertion of the battery into power supply section 15 (start of a third timer) and ends the counting in accordance with the elapse of a predetermined time (expiration of the third timer).

RAM 30 is a working memory of DECT communication control section 28.

EEPROM 51 includes registration information storing section 51*a*. Registration information storing section 51*a* stores a locator ID of locator 3 therein.

Hereinafter, an intermittent operation of DECT communication unit 73 of mobile information terminal 2 will be described.

In the On state, switch 34 supplies power to the communication block from power supply section 15. On the other hand, in the Off state, switch 34 blocks the supply of power to the communication block. When the supply of power is blocked, the communication block is in a sleep state.

Timer section 33 operates as a first timer. The first timer counts a time period set in advance as a sleep period of the communication block and switches switch 34 from the Off state to the On state each time when such a period expires. In other words, timer section 33 is supplied with a low-speed clock from first clock generating section 32 and performs a counting process in accordance with the low-speed clock. Timer section 33 records a value (expiration value) used for determining the sleep period in a register (not illustrated in the drawing) thereof. Then, timer section 33 counts up in accordance with a clock signal transmitted from first clock generating section 32 in a sleep state and ends the counting when the counted value arrives at the expiration value. Then, timer section 33 notifies switch 34 of the end of the counting.

In other words, timer section 33 starts counting by being triggered upon the stop of power supply to the communication block (start of the first timer) and counts a predetermined time period during the stop of the communication block. Then, when the counting ends (the first timer expires), timer section 33 switches switch 34 to the On state and starts supplying power to the communication block.

In this way, DECT communication unit 73 of mobile information terminal 2 performs an intermittent reception operation even in the outside mode and repeats operations of returning from the sleep period at a predetermined interval, performing a reception operation for a predetermined period, and returning to the sleep state. In accordance with the notification of the end of the counting from timer section 33 described above, switch 34 is switched to the On state from the Off state and starts supplying power to the communication block.

Here, the functional sections included in mobile information terminal 2 are not limited to the functional sections illustrated in FIG. 3, and another functional section may be included therein. The other functional section may be used either for realizing main functions of mobile information terminal 2 or for realizing an auxiliary function supporting a main function.

As above, the example of the configuration of mobile information terminal 2 has been described.

Figure 4:
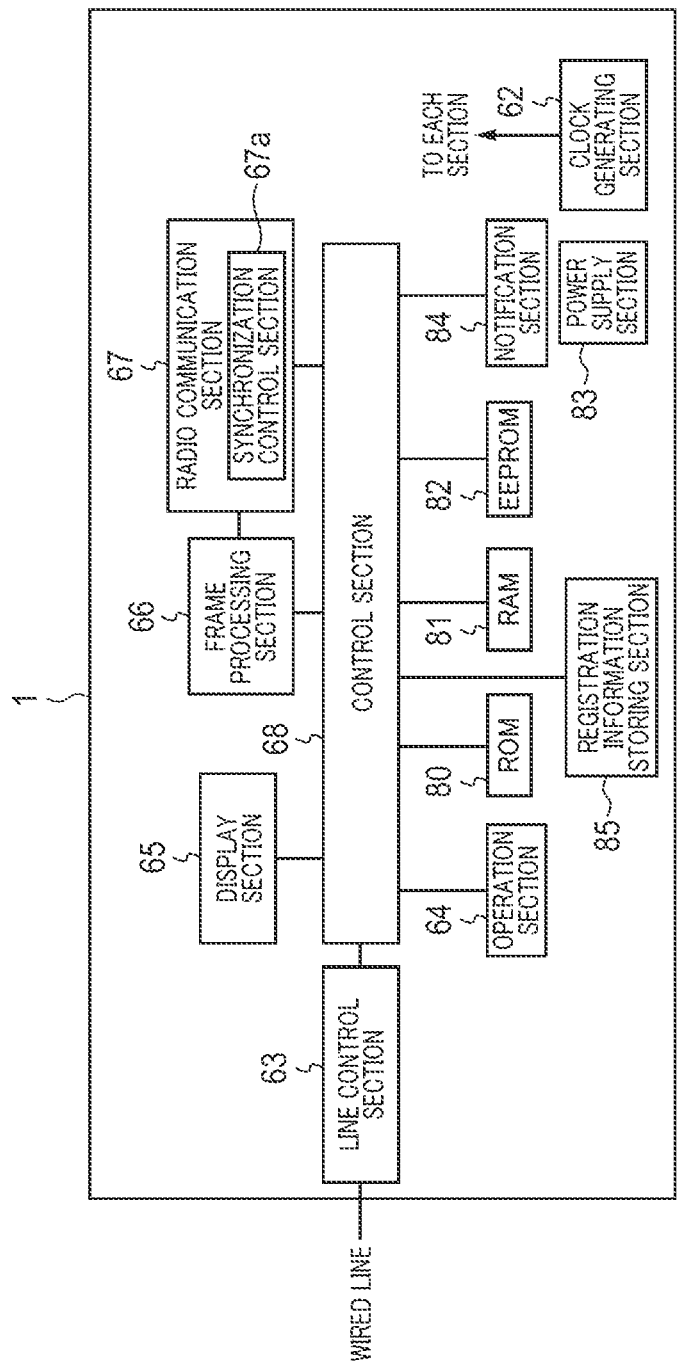
FIG. 4 is a block diagram that illustrates an example of the configuration of a base unit of the radio communication system.

Next, an example of the configuration of base unit 1 will be described. FIG. 4 is a block diagram that illustrates the example of the configuration of base unit 1.

As illustrated in FIG. 4, base unit 1 is equipped with clock generating section 62, line control section 63, operation section 64, display section 65, frame processing section 66, radio communication section 67, control section 68, ROM 80, RAM 81, and EEPROM 82. In addition, base unit 1 is equipped with power supply section 83, notification section 84, and registration information storing section 85.

Power supply section 83 supplies power that is used for operating base unit 1. Clock generating section 62 generates a clock signal used for operating each section of base unit 1 based on the power that is supplied from power supply section 83. Clock generating section 62, for example, includes a crystal oscillation circuit. Line control section 63 communicates with a wired telephone network.

Operation section 64 includes buttons used for receiving various user operations. Display section 65, for example, includes a liquid crystal display and, for example, displays a telephone number, an operation menu of base unit 1, and the like.

Frame processing section 66 embeds frame transmission information matching an operation mode of that moment and transfers the frame transmission information to radio communication section 67. The frame configuration of DECT is used when frame processing section 66 communicates with mobile information terminal 2 or cordless handset 4, and the frame configuration for the locator is used when frame processing section 66 communicates with locator 3.

Radio communication section 67 performs radio communication with mobile information terminal 2 and another cordless handset using the TDMA/TDD mode. In this embodiment, radio communication section 67 performs radio communication, for example, using the DECT protocol. Synchronization control section 67a provided in radio communication section 67 determines communication timing of a communication signal according to radio communication section 67 based on the reference clock of clock generating section 62.

Control section 68 includes a CPU and controls the overall operation of base unit 1 in cooperation with the above-described sections. ROM 80, for example, stores control programs used by control section 68 and various kinds of data therein. RAM 81 and EEPROM 82 are working memories of control section 68.

Notification section 84, for example, includes a small speaker and outputs a notification sound when a calling signal is received from line control section 63. Registration information storing section 85 stores the ID of each terminal that is mobile information terminal 2, which is a communication opponent, an ID of another cordless handset, and an ID of locator 3 therein in addition to the ID of base unit 1.

As above, the example of the configuration of base unit 1 has been described.

Figure 5:
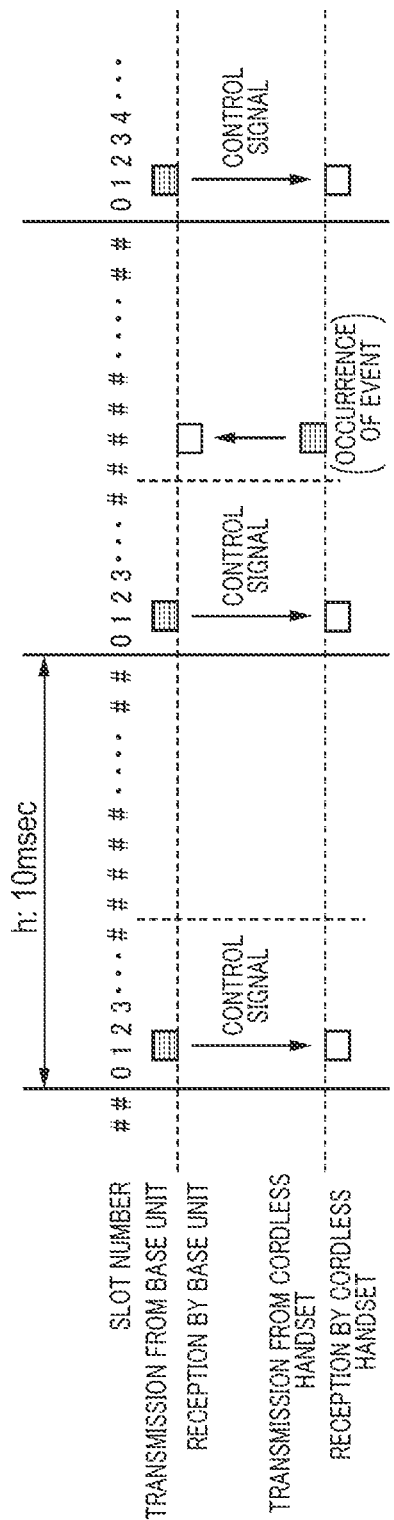
FIG. 5 is a timing diagram that illustrates an example of TDMA communication between the base unit and a cordless handset (or the mobile information terminal) in a normal state in the radio communication system.

Next, an example of the configuration of a communication frame in TDMA communication used in this embodiment will be described with reference to FIG. 5. FIG. 5 illustrates an example of TDMA communication performed between base unit 1 and a cordless handset (or a mobile information terminal 2) in the normal state.

In radio communication according to DECT, for example, as illustrated in FIG. 5, a time division mode is used in which communication is performed by setting 10 msec as one frame and dividing one frame into 24 slots. Base unit 1 transmits the base unit ID using a control signal, and the cordless handset (or mobile information terminal 2) acquires the base unit ID while receiving the control signal, compares the acquired base unit ID with the ID of a base unit (registered base unit) for which mobile information terminal 2 stands by, and selects a base unit to be synchronized with.

In addition, during the standby, the cordless handset 4 (or mobile information terminal 2) transmits nothing to base unit 1 for every frame, and transmission from the cordless handset 4 (or mobile information terminal 2) to base unit 1 is performed only when an event such as an outgoing call occurs and a phone call state is formed. In such a case, the cordless handset 4 (or mobile information terminal 2) selects one slot and performs communication using upstream and downstream slots thereof.

Base unit 1 constantly transmits a control signal in a predetermined slot for each frame. A control signal serving as a synchronization signal includes synchronization data (for example, Syncword). The Syncword is a known digit sequence determined in advance for timing synchronization and is synchronization information used for the synchronization of mobile information terminal 2. The reception side starts cutting out and taking in a frame at a time point when this known digit sequence is found.

In the DECT mode, a unique Syncword is assigned to each network, and the Syncword is included to be common to signals transmitted from terminals.

During standby, locator 3 does not receive a control signal from base unit 1 and is not synchronized with base unit 1. Locator 3, during standby, performs a reception operation during time corresponding to two slots regularly and independently and waits for a signal transmitted from mobile information terminal 2 or base unit 1. In a case where the signal transmitted from mobile information terminal 2 or base unit 1 is received, locator 3 performs communication according to the locator protocol to be described later in synchronization with mobile information terminal 2 or base unit 1. The method used for the synchronization of locator 3 is as described above, and, for example, Syncword is included in a locator calling signal transmitted from mobile information terminal 2, and the locator can be synchronized with mobile information terminal 2.

Example 1

Figure 6:
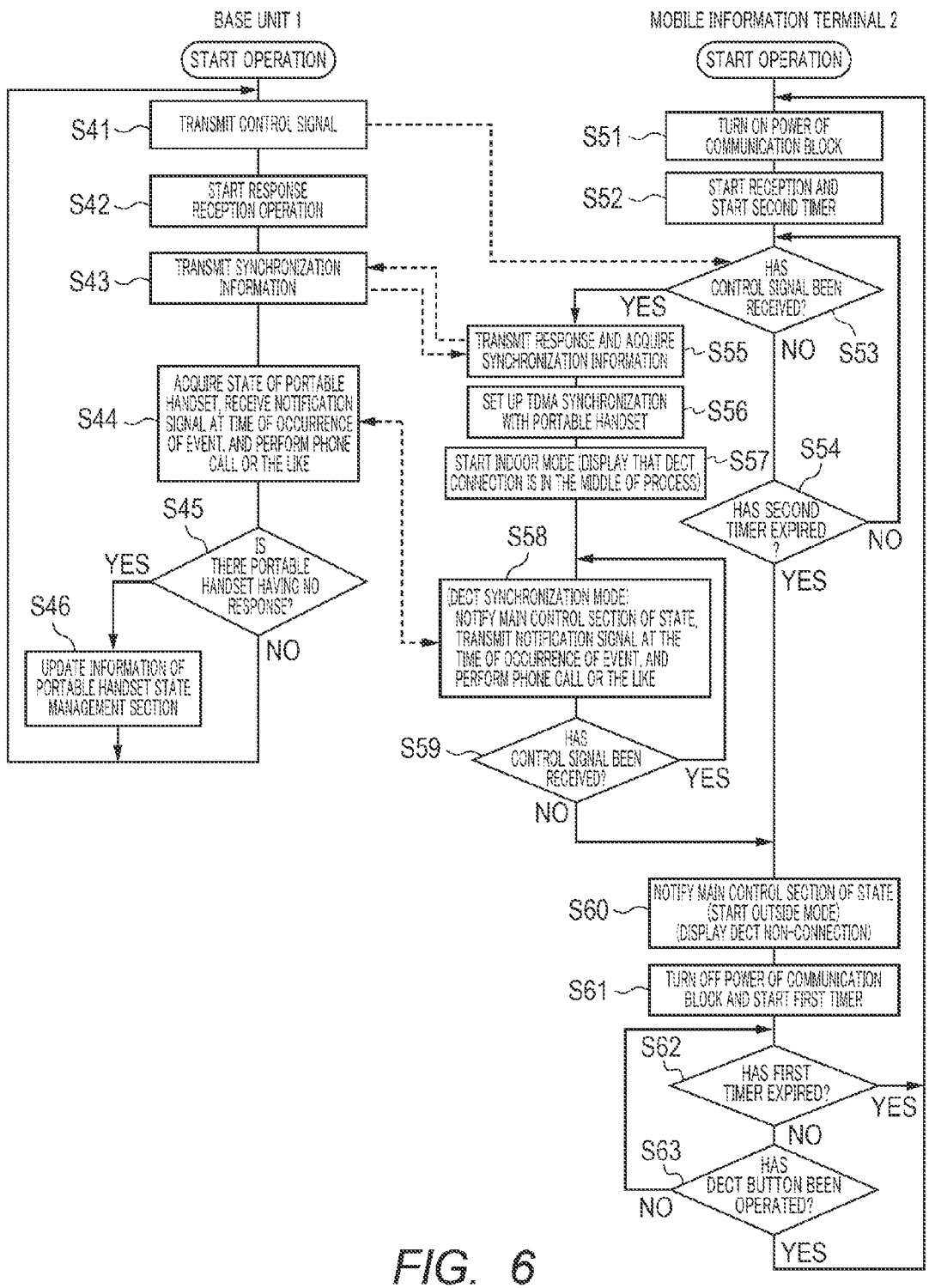
FIG. 6 is a flowchart that illustrates an example of the operation of the mobile information terminal for being synchronized with the base unit in the radio communication system.

Next, an example of the operation of the above-described radio communication system will be described. FIG. 6 is a flowchart that illustrates an example of the operation of DECT communication unit 73 of mobile information terminal 2 for searching for base unit 1 and the operation of mobile information terminal 2 for being synchronized with base unit 1 in the radio communication system.

First, base unit 1 will be described. When base unit 1 starts an operation by being supplied with power, the standby mode started, and in Step S41, base unit 1 starts transmitting a control signal. In addition, in Step S42, base unit 1 performs an operation of receiving a response signal transmitted from each portable handset using a reception slot having predetermined time/position relationship with respect to the slot in which the control signal is transmitted. In addition, in Step S42, synchronization information is inserted into the control signal and is transmitted.

In mobile information terminal 2, when the power switch (not illustrated in the figure) is turned on in Step S51, main control section 10 and each section are supplied with power, and the communication block of DECT communication unit 73 is supplied with power. In addition, under the control of main control section 10, various kinds of user interfaces are displayed on operation display section 11, and a "DECT" button used by the user for the instruction of starting DECT communication is displayed thereon.

In Step S52, DECT communication control section 28 of DECT communication unit 73 instructs radio communication section 27 to start a reception operation of continuously searching (open search) for a signal transmitted from base unit 1. Then, the second timer is started by timer section 23 that counts high-speed clock signals transmitted from DECT clock generating section 22. In accordance with the starting of the second timer, mobile information terminal 2 becomes in a state in which a signal transmitted from base unit 1 can be received.

In Step S53, when a control signal transmitted from base unit 1 is received by radio communication section 27 (Yes in Step S53), the flow proceeds to Step S55. On the other hand, when a control signal is not received (No in Step S53), the flow proceeds to Step S54.

In Step S54, DECT communication control section 28 determines whether or not the second timer has expired. In a case where the second timer has not expired (No in Step S54) as a result of the determination made in Step S54, the flow returns to Step S53. On the other hand, in a case where the second timer has expired (Yes in Step S54) as a result of the determination made in Step S54, the flow proceeds to Step S60.

In Step S55, DECT communication control section 28 transmits a response signal through radio communication section 27. In Step S56, in accordance with information transmitted from base unit 1, DECT communication control section 28 sets up TDMA synchronization with base unit 1. The operations of Steps S52 to S56 are illustrated in FIG. 5 described above.

In Step S57, DECT communication control section 28 of DECT communication unit 73 determines that DECT communication can be performed and transfers the information to main control section 10, and main control section 10 starts the indoor mode and performs a display operation representing "in the middle of a DECT connection" on operation display section 11. For example, an antenna mark is displayed near "DECT" characters.

In Step S58, DECT communication unit 73 of mobile information terminal 2 communicates with base unit 1 in the DECT synchronization mode. During standby, as illustrated in FIG. 5, the synchronization state is maintained while a control signal transmitted from base unit 1 is received. In a case where an event occurs, for example, in a case where the user using mobile information terminal 2 performs an operation of originating a call toward DECT communication unit 73 or in a case where information representing that there is an incoming call from a fixed telephone network is transmitted in accordance with a control signal transmitted from base unit 1, as illustrated in FIG. 5, DECT communication unit 73 transmits various notification signals to base unit 1. In addition, base unit 1 is notified of the other information that is necessary, for example, the intensity of the received electric field, error information, the state of locator 3, and the like. Furthermore, in a case where GPS location information calculating unit 72 operates, DECT communication unit 73 notifies base unit 1 of the state of self-location information or the like as is necessary.

In addition, in Step S58, in a case where a voice phone call is started through the fixed telephone network, DECT communication unit 73 transmits or receives voice data to/from base unit 1 by using each one slot for uplink/downlink.

In Step S59, in a case where DECT communication unit 73 cannot receive a control signal transmitted from base unit 1 (No in Step S59), the flow proceeds to Step S60. On the other hand, in a case where DECT communication unit 73 could receive a control signal transmitted from base unit 1 (Yes in Step S59), the flow returns to Step S58.

Figure 7:
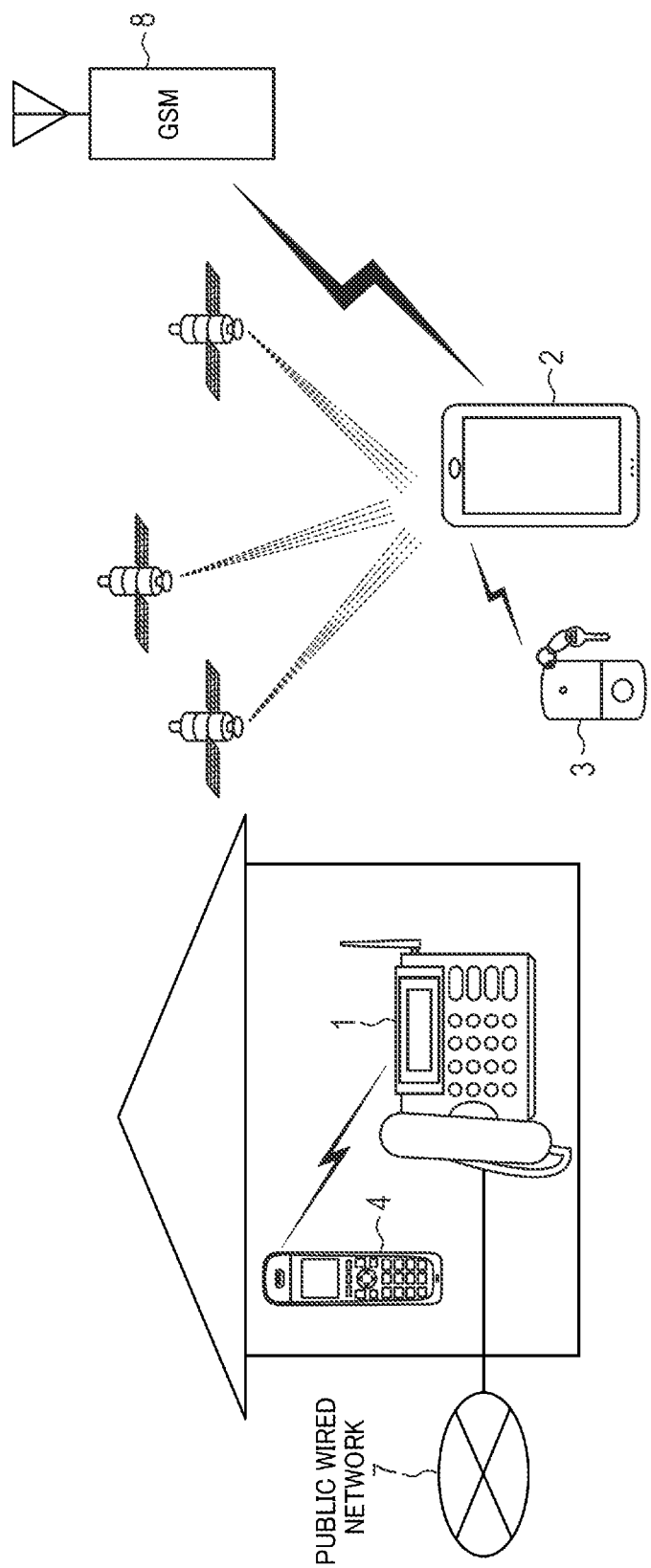
FIG. 7 is a schematic diagram that illustrates an example of a case where a user having the mobile information terminal with him goes out in the radio communication system according to the present invention.

In Step S60, DECT communication control section 28 of DECT communication unit 73 determines that DECT communication cannot be performed and transfers the information to main control section 10, and main control section 10 starts the outside mode and performs a display operation representing "No DECT connection" on operation display section 11. For example, as illustrated in FIG. 7, "x" is displayed on the antenna mark disposed near the "DECT" characters in an overlapping manner.

In Step S61, DECT communication unit 73 blocks power to the communication block by turning off switch 34 of DECT communication unit 73. The first timer is started by timer section 33 that counts a low-speed clock signals transmitted from first clock generating section 32 by being triggered upon the blocking of the power to the communication block. Thereafter, while the communication operation of DECT communication unit 73 is stopped, the first timer counts up. Even while the operation of DECT communication unit 73 is stopped, as described above, the "DECT" button used by the user for issuing an instruction used for starting DECT communication is displayed on operation display section 11.

In Step S62, before the first timer expires, the communication operation of DECT communication unit 73 is stopped. When the "DECT" button described above is operated in this state, the main control section 10 detects the operation, and main control section 10 performs control for turning on switch 34 by being triggered upon the detection. When switch 34 is turned on by main control section 10, and power is supplied to the communication block of DECT communication unit 73, DECT communication control section 28 starts the operation, and information representing the operation of the "DECT" button, which has been detected by main control section 10, is transmitted to DECT communication control section 28.

In Step S63, DECT communication control section 28 determines whether or not the information representing the operation of the "DECT" button has been transmitted. In a case where the "DECT" button has not been operated (No in Step S63), the flow returns to Step S62, and the communication operation of DECT communication unit 73 is stopped until the first timer expires.

In a case where the information of the operation of the "DECT" button has been transmitted (Yes in Step S63) as a result of the determination made in Step S63, the flow returns to Step S51. Then, in Step S51, when power is supplied to the communication block, in Step S52, DECT communication control section 28 instructs radio communication section 27 to start a reception operation. After this, the operations of Step S52 and subsequent steps described above are performed again, and the communication operation of DECT communication unit 73 is resumed.

In a case where the first timer has expired (Yes in Step S62) as a result of the determination made in Step S62, the flow returns to Step S51 again. Also in this case, DECT communication control section 28 instructs radio communication section 27 to start a reception operation, the operations of Step S52 and subsequent steps described above are performed again, and the communication operation of DECT communication unit 73 is resumed.

In Step S44, base unit 1 receives a notification signal relating to an event from the above-described mobile information terminal or the other portable handsets and performs communication for checking the states of the portable handsets. In addition, in a case where a voice phone call is started through the fixed telephone network, base unit 1 transmits or receives voice data to/from the mobile information terminal or any other portable handset by using each one slot for uplink/downlink. In addition, in a case where GPS location information calculating unit 72 of mobile information terminal 2 operates, base unit 1 receives information such as self-location information transmitted from mobile information terminal 2 as is necessary.

In Step S45, it is determined whether or not there is a portable handset out of registered portable handsets that has not responded to the request from the base unit. In a case where there is a portable handset that has not responded to the request from the base unit (Yes in Step S45), in Step S46, the information of a portable handset management section of registration information storing section 85 is updated, and a flag of "No response" is set for the portable handset. On the other hand, in Step S45, in a case where there is no portable handset that has not responded to the request from the base unit (No in Step S45), the flow returns to Step S41.

Figure 8:
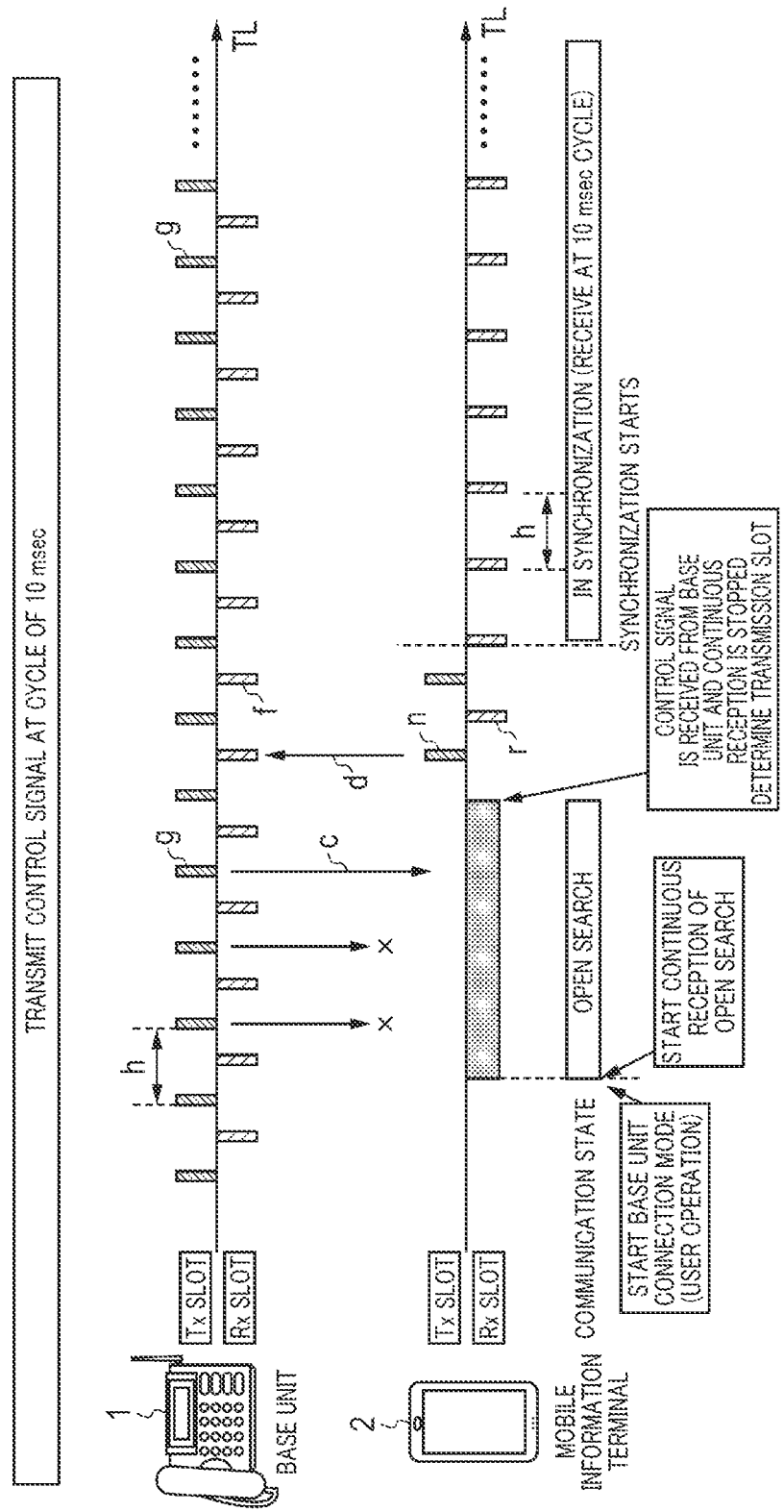
FIG. 8 is a timing diagram that illustrates an example of the operation of the mobile information terminal for being synchronized with the base unit in the radio communication system.

FIG. 8 is a timing diagram that illustrates an example of the operation of mobile information terminal 2 for being synchronized with base unit 1 in the radio communication system.

As described above, base unit 1 transmits a control signal in a predetermined transmission slot at a period h by using a predetermined reception frequency. Here, h represents one frame (10 ms) of DECT.

In a case where mobile information terminal 2 starts the operation by being supplied with power or in a case where a base unit connection mode is started by operating the "DECT" button on operation display section 11, DECT communication control section 28 starts timer section 23 and controls radio communication section 27 so as to perform continuous reception (open search) for searching a signal transmitted from base unit 1. In the open search, a continuous reception operation is performed with the reception frequency being changed, received data is transmitted to frame processing section 26, and information is extracted therefrom.

When the reception frequency of radio communication section 27 and the transmission frequency of the control signal (symbol "C" illustrated in FIG. 8) coincide with each other at specific timing, the data of the signal received by radio communication section 27 is transmitted to frame processing section 26, and, when there is the information for synchronization, it is recognized that the control signal transmitted from base unit 1 has been received, and DECT communication control section 28 stops the continuous reception at a time point at which the information for synchronization is provided. In a case where a control signal transmitted from base unit 1 has not been received, DECT communication control section 28 repeats the open search for a predetermined time period and then enters the sleep state.

In a case where the control signal (symbol "C" illustrated in FIG. 8) can be received using one slot, DECT communication control section 28 can receive timing information transmitted from base unit 1 with being carried in the control signal. Thus, DECT communication control section 28 determines a transmission slot (slot n) used for transmitting a response signal based on the timing information and starts preparing the transmission of the response signal. Then, locator 3 transmits the response signal using slot n. In addition, DECT communication control section 28 determines a reception slot (slot r) used for receiving a control signal thereafter based on the timing information transmitted from base unit 1 with being carried in the control signal.

When the response signal transmitted from mobile information terminal 2 using slot n is received, base unit 1 updates the information of the portable handset state management section of registration information storing section 85 and sets a flag of "response present" for mobile information terminal 2.

DECT communication control section 28 transmits a response signal using the transmission slot (slot n) for a predetermined number of times or until a necessary notification is completed. Thereafter, DECT communication control section 28 performs a reception operation using the reception slot (slot r) used for receiving a control signal and maintains the synchronization with base unit 1 while receiving a control signal transmitted from base unit 1.

In this way, within a range in which signals arrive at respective devices, mobile information terminal 2 communicates with base unit 1 with being synchronized therewith. When mobile information terminal 2 and base unit 1 become far apart from each other and are outside the signal arrival zone, DECT communication unit 73 does not perform an operation of continuously searching for base unit 1. DECT communication unit 73 is started at an interval defined by the first timer and searches for base unit 1, and when DECT communication unit 73 ends searching for base unit 1, DECT communication unit 73 enters the sleep state. When mobile information terminal 2 is outside the signal arrival zone, by performing a display operation that represents "DECT non-connection," the user can be urged to call his attention. Even when mobile information terminal 2 is in the sleep state, if the user operates the "DECT" button, DECT communication unit 73 is started and starts searching for base unit 1. Accordingly, the communication with base unit 1 can be immediately resumed in a case where mobile information terminal 2 is within the signal arrival zone of base unit 1. Here, the interval defined by the first timer, for example, may be one to two minutes.

In the above-described example, after the communication with base unit 1 cannot be performed, mobile information terminal 2 performs the operation of searching for a base unit at the interval (first predetermined cycle) defined by the first timer, the period of the interval, however, may be changed to be long after a predetermined period further elapses.

In other words, after the communication with base unit 1 cannot be performed, mobile information terminal 2 searches for a base unit at a first predetermined cycle defined by the first timer, then, changes an expiration value of the first timer when a following predetermined period elapses, and sets an expiration value (second predetermined cycle) longer than the first predetermined cycle to the first timer.

As above, the operation of mobile information terminal 2 for being synchronized with the base unit in the radio communication system has been described.

Example 2

Figure 9:
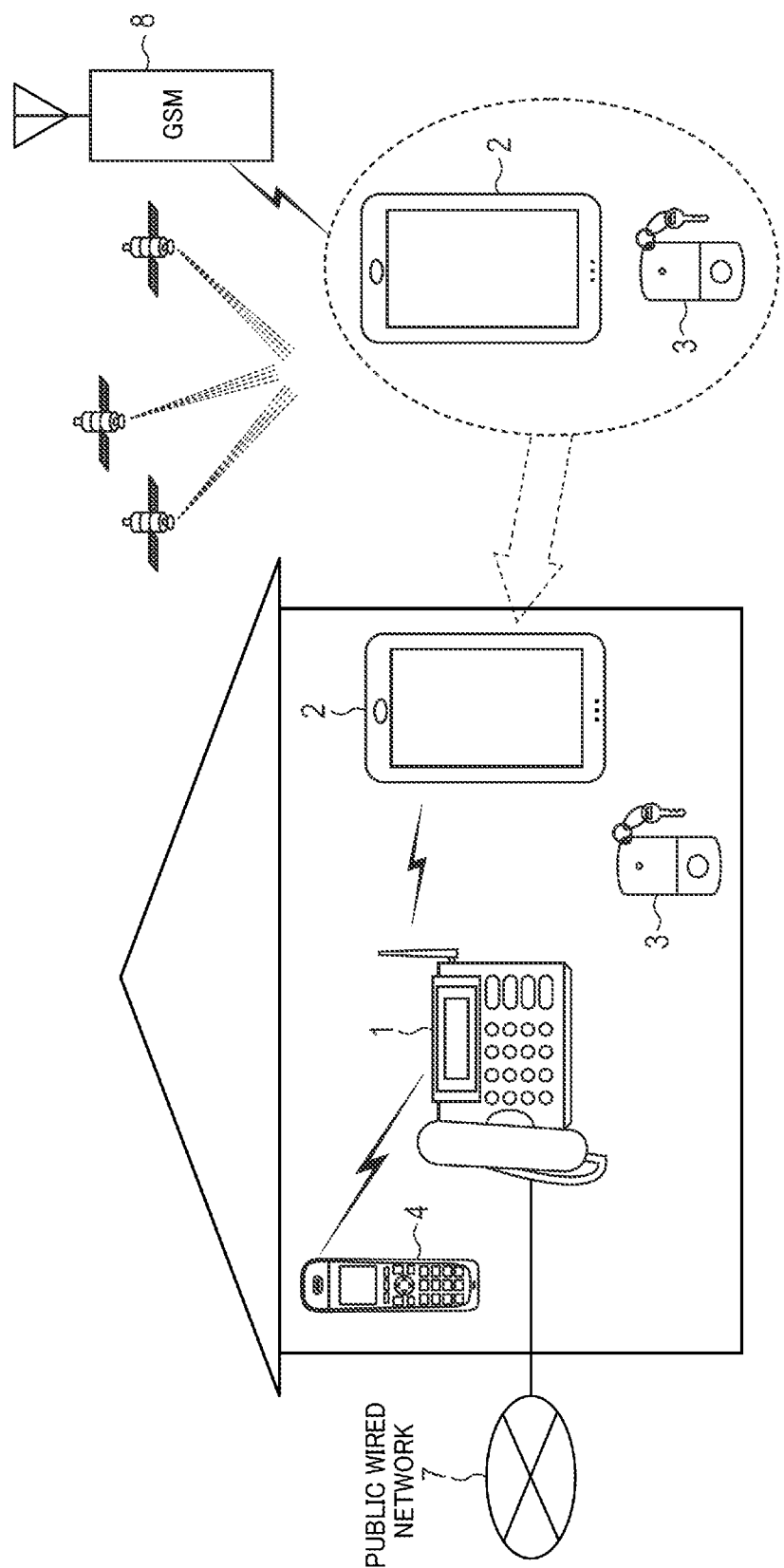
FIG. 9 is a schematic diagram that illustrates an example of a case where a user having the mobile information terminal with him returns home in the radio communication system according to the present invention.

In the previous embodiment, when mobile information terminal 2 can no longer communicate with base unit 1 (when the user goes out), the period of the search for base unit 1 is set to be very long. However, when the user forgets to switch the mode (for example, the operation of the "DECT" button) at the time of returning home, mobile information terminal 2 does not start communicating with base unit 1, and accordingly, information cannot be acquired from base unit 1. Alternatively, the link setup with base unit 1 is delayed in accordance with the period of the search, and accordingly, the acquisition of the information is delayed. FIG. 9 illustrates the state in a case where a user having mobile information terminal 2 with him returns home, and mobile information terminal 2 and base unit 1 become communicable with each other.

In this embodiment, when mobile information terminal 2 can no longer communicate with base unit 1 (when the user goes out), the period of the search for the base unit is increased (the interval, for example, is one to two minutes), and, in a case where mobile information terminal 2 performs location positioning using GPS location information calculating unit 72, an open search for base unit 1 is automatically performed by being triggered upon the location thereof (the location of base unit 1) being within a predetermined range. Regarding the predetermined range, positioning may be performed in the state in which mobile information terminal 2 is placed on the side of base unit 1 in advance, and the data of self-location may be preset.

Accordingly, even in a case where the user forgets to switch the mode when returning home, base unit 1 automatically starts communication, and mobile information terminal 2 can acquire information from base unit 1. As the information acquired by mobile information terminal 2 from base unit 1 at the time of returning home, for example, there is a record of an incoming call in the fixed telephone network during the absence of user, the content of an answering machine message, or the like. Even when the operation of the "DECT" button is forgotten, the record of an incoming call in the fixed telephone network during the absence of user can be displayed on the operation display section according to communication with base unit 1, or a notification sound can be generated when the user returns home.

In addition, by automatically switching mobile information terminal 2 to the in-house mode by being triggered upon the reception of a signal transmitted from base unit 1, the functions enabled in the in-house mode are automatically started, whereby the user does not need to pay attention to switching to the in-house mode.

Furthermore, since mobile information terminal 2 stops the positioning operation of GPS location information calculating unit 72 by being triggered upon the reception of a signal transmitted from base unit 1, the user can stop the positioning operation without being aware of the mode switching, whereby unnecessary consumption of the battery can be prevented.

Example 3

Mobile information terminal 2 searches for base unit 1 on a regular basis even in a case where a signal cannot be received from base unit 1. However, when the search for base unit 1 is frequently performed, the consumption of the battery of mobile information terminal 2 increases.

In this embodiment, mobile information terminal 2 operates GPS location information calculating unit 72, and, in a case where the location thereof enters or approaches a predetermined range (the location of the base unit), the period of the search for a control signal is shortened. On the other hand, in a case where the location of mobile information terminal 2 is out of the predetermined range, the period of the search for a control signal is lengthened, or the search is stopped. In this way, an unnecessary communication operation is prevented, whereby the power consumption can be reduced.

However, this embodiment is effective in a case where mobile information terminal 2 constantly performs GPS positioning, and the effect is low in a case where the power consumption for GPS positioning is higher than the power consumption for searching for a DECT control signal.

Example 4

Next, the control process of the base unit search mode of mobile information terminal 2 using the GPS function of mobile information terminal 2 will be described.

In a case where mobile information terminal 2 performs GPS positioning, the mobile information terminal of this example does not constantly operate GPS location information calculating unit 72 but operates GPS location information calculating unit 72 in accordance with the timing at which mobile information terminal 2 operates the communication block of DECT communication unit 73 by supplying power thereto, and self-location data at that time is stored in self-location data table 30a.

Figure 10:
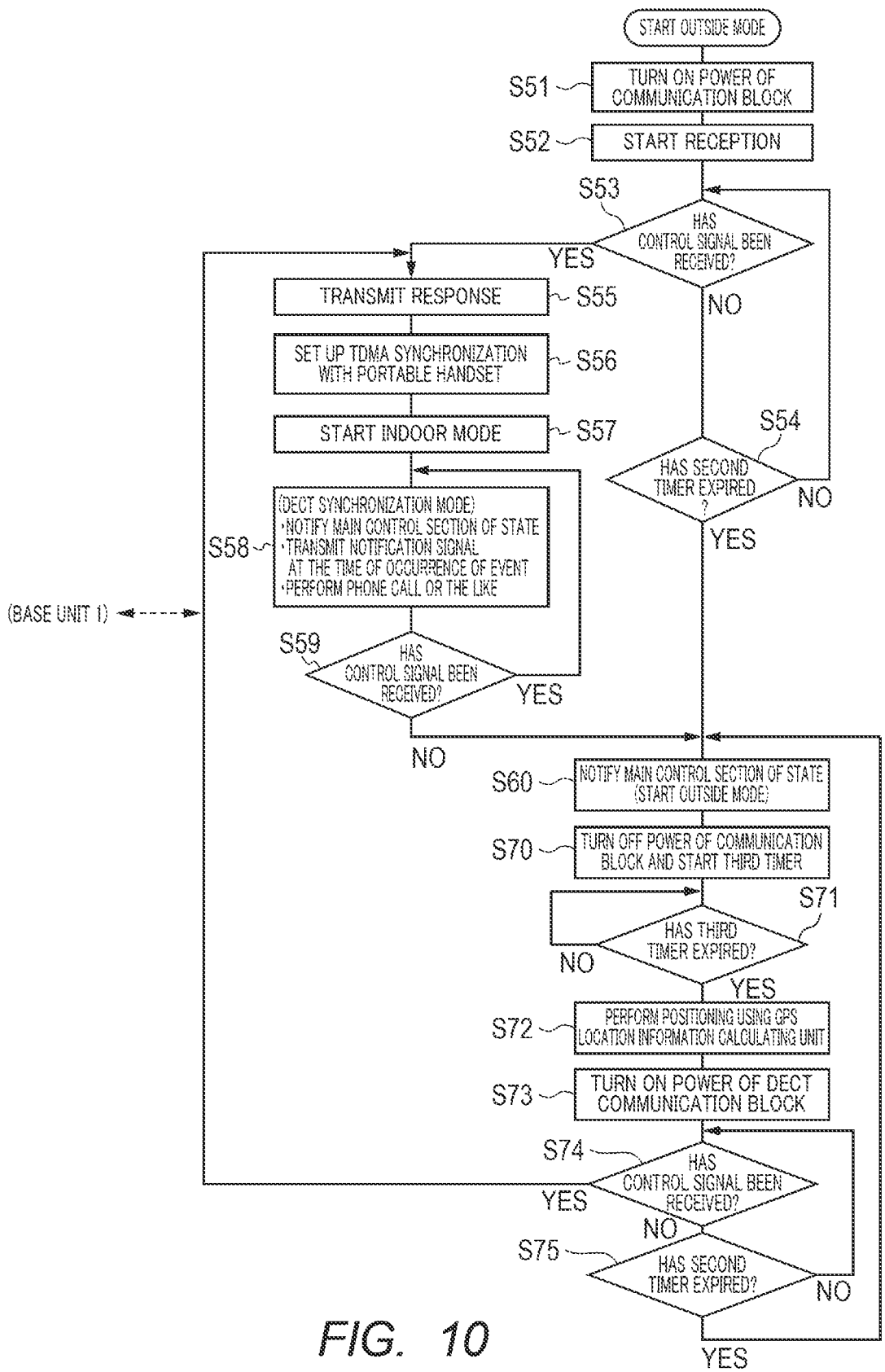
FIG. 10 is a flowchart that illustrates an example of the operation of the mobile information terminal for recording self-location data in the radio communication system.

In FIG. 10, the operations before Step S60 are the same as those illustrated in FIG. 6. In other words, in Step S54, in a case where the second timer has expires (Yes in Step S54) or in a case where a control signal cannot be received (No in Step S59) in the determination made in Step S59, main control section 10 is notified that DECT communication cannot be performed in Step S60. Main control section 10 starts the outside mode, performs a display operation representing "DECT non-connection" on operation display section 11, and the flow proceeds to Step S70.

In Step S70, DECT communication unit 73 blocks power to the communication block by turning off switch 34. In addition, a third timer is started by timer section 33 that counts low-speed clock signals transmitted from first clock generating section 32 by being triggered upon the blocking of the power to the communication block. Thereafter, while the communication operation of DECT communication unit 73 is stopped, the third timer counts up, and the communication operation of DECT communication unit 73 is stopped until the third timer expires (Yes in Step S71).

In Step S71, when the third timer expires, the information is transmitted to main control section 10, and the self-location data of mobile information terminal 2 that is generated by GPS location information calculating unit 72 is transmitted to main control section 10. Then, main control section 10 controls GPS location information calculating unit 72, and GPS location information calculating unit 72 generates data (self-location data) of the current location coordinates by performing calculation based on information supplied from GPS satellite 9. The self-location data at that time is sequentially recorded in self-location data table 30a. In Step S72, the self-location data is transmitted to DECT communication unit 73.

In Step S73, the communication block of DECT communication unit 73 is supplied with power again, and DECT communication control section 28 instructs radio communication section 27 to start a reception operation. Thereafter, the operations of Step S52 and subsequent steps described above are performed again, and the communication operation of DECT communication unit 73 is resumed. In other words, a reception operation for continuously searching (open search) for a signal transmitted from base unit 1 is started, and, in a case where the second timer has not expired (No in Step S75), the flow returns to Step S74. In a case where a control signal has been received (Yes in Step S74), the flow proceeds to Step S55 described above.

According to the above-described configuration, GPS location information calculating unit 72 is operated in accordance with the timing at which the communication block of DECT communication unit 73 is operated by being supplied with power, and accordingly, the power consumption efficiency of main control section 10 and each section can be raised, whereby the power consumption can be reduced.

Example 5

In addition, in a case where a "constant locator monitoring mode" in which mobile information terminal 2 monitors locator 3 on a regular basis is provided, by operating GPS location information calculating unit 72 in accordance with the timing at which the communication block of DECT communication unit 73 as described above is operated, the effect is further improved.

Main control section 10 of mobile information terminal 2 transmits a locator calling signal by operating DECT communication unit 73 at a predetermined period (for example, every three minutes) on a regular basis. During this monitoring operation, mobile information terminal 2 transmits a locator calling signal using a channel receivable for locator 3 and waits for a response signal transmitted from locator 3.

In a case where GPS location information calculating unit 72 is operated by mobile information terminal 2, GPS location information calculating unit 72 generates data (self-location data) of the current location coordinates by performing calculation based on the information supplied from GPS satellite 9. When GPS location information calculating unit 72 is operated in parallel with the monitoring operation, the self-location data of mobile information terminal 2 that is generated by GPS location information calculating unit 72 is transmitted to main control section 10.

FIG. 11 illustrates an example of information recorded in self-location data table 30a of mobile information terminal 2. At the timing at which DECT communication unit 73 transmits a locator calling signal on a regular basis, main control section 10 sequentially records self-location data at that time, as illustrated in FIG. 11, in self-location data table 30a. At that time, in a case where there is no response signal transmitted from locator 3, the "abnormality" flag is recorded together with the self-location data. Based on the information recorded in self-location data table 30a of mobile information terminal 2, the user can easily estimate the location at which mobile information terminal 2 is lost.

INDUSTRIAL APPLICABILITY

The radio communication system and the mobile information terminal according to the present invention, when a radio communication apparatus and a highly functional mobile information terminal, which are closely located, are linked together, switching between operation modes can be automatically performed, and accordingly, an unnecessary operation is prevented, whereby the power consumption can be reduced.

REFERENCE SIGNS LIST

1 Base unit
2 Mobile information terminal
3 Locator
7 Public wired network
8 Public radio network
10 Main control section
11 Operation display section
13 Line control section
14 Notification section
24 Phone call section
25 Input key switch
28 DECT communication control section
30 RAM
30a Self-location data table
27, 67 Radio communication section
38, 68 Control section
34 Switch
63 Line control section
51, 82 EEPROM
71 Public radio communication unit
72 GPS location information calculating unit
73 DECT communication unit

The invention claimed is:

1. A radio communication system comprising:
a base unit in compliance with a near filed communication protocol operable to connect with a public wired network; and
a mobile information terminal that includes a near field radio communicator operable to wirelessly connect with the base unit using the near field communication protocol, and that includes a public radio communicator operable to wirelessly connect with a public radio network comprising a cellular phone network, wherein:
the mobile information terminal is configured to, after a first time period of receiving no signal from the base unit or in response to a defined user operation performed on the mobile information terminal, enter into a first search mode of searching for the base unit at a first cycle for a second time period and, after the second time period of receiving no signal from the base unit, enter into a second search mode of searching for the base unit at a second cycle that is longer than the first cycle; and
the base unit, in operation,
records one or more events that occur while the mobile information terminal is disconnected, and
when the mobile information terminal is reconnected, transmits information relating to the one or more events to the mobile information terminal for display.

2. The radio communication system according to claim 1, wherein the one or more events include one or more incoming calls received from the public wired network.

3. The radio communication system according to claim 1, wherein the one or more events include one or more answering machine messages.

4. The radio communication system according to claim 1, wherein the first search mode and the second search mode are part of a sleep state of the mobile information terminal.

5. The radio communication system according to claim 1, wherein, in the first search mode, the mobile information terminal displays that there is no near field radio connection.

6. The radio communication system according to claim 1, wherein the mobile information terminal, when disconnected from the base unit, displays that there is no near field radio connection.

7. The radio communication system according to claim 1, wherein the mobile information terminal further includes a touch panel, and is operable to connect with the Internet through the public radio network.

8. A mobile information terminal comprising:
a near field radio communicator operable to wirelessly connect with a base unit of a radio communication system using a near field communication protocol, wherein the base unit is in compliance with the near field communication protocol; and
a public radio communicator operable to wirelessly connect with a public radio network comprising a cellular phone network, wherein
the mobile information terminal is configured to,
after a first time period of receiving no signal from the base unit or in response to a defined user operation performed on the mobile information terminal, enter into a first search mode of searching for the base unit at a first cycle for a second time period,
after the second time period of receiving no signal from the base unit, enter into a second search mode of searching for the base unit at a second cycle that is longer than the first cycle, and
when reconnected with the base unit, receive from the base unit information relating to one or more events that have occurred while the mobile information terminal was disconnected from the base unit and display the received information.

9. The mobile information terminal according to claim 8, wherein:

in the first time period of receiving no signal from the base unit, the mobile information terminal is in a continuous search mode of continuously searching for the base unit; and in the first search mode, the mobile information terminal displays that there is no near field non-connection.

10. The mobile information terminal according to claim 8, wherein the one or more events include one or more incoming calls that the base unit received from the public wired network.

11. The mobile information terminal according to claim 8, wherein the one or more events include one or more answering machine messages.

12. The mobile information terminal according to claim 8, wherein the first search mode and the second search mode are part of a sleep state of the mobile information terminal.

13. The mobile information terminal according to claim 8, which is configured to display that there is no near field radio connection when disconnected from the base unit.

14. The mobile information terminal according to claim 13, which is configured to display that there is no near field radio connection in the first search mode and in the second search mode.

15. The mobile information terminal according to claim 8, further comprising a touch panel.

* * * * *